United States Patent [19]
Shiosaki

[11] Patent Number: 4,954,918
[45] Date of Patent: Sep. 4, 1990

[54] CASSETTE TRANSFER APPARATUS

[75] Inventor: Masao Shiosaki, Yokohama, Japan

[73] Assignee: Kabushiki Kaisha Toshiba, Kawasaki, Japan

[21] Appl. No.: 323,692

[22] Filed: Mar. 15, 1989

[30] Foreign Application Priority Data

Mar. 17, 1988 [JP] Japan .................................. 63-64055

[51] Int. Cl.⁵ ........................ G11B 5/012; G11B 15/68
[52] U.S. Cl. ................................... 360/98.06; 360/92
[58] Field of Search ................ 360/92, 98.04–98.06; 369/34, 36–39; 414/273, 276, 277, 280–283, 659–663

[56] References Cited

U.S. PATENT DOCUMENTS

| | | |
|---|---|---|
| 4,608,681 | 8/1986 | Shiosaki . |
| 4,815,056 | 3/1989 | Toi .............................. 360/98.05 X |
| 4,855,980 | 8/1989 | Hug ........................................ 369/36 |

FOREIGN PATENT DOCUMENTS

183856 11/1987 European Pat. Off. .
3714559A1 11/1987 Fed. Rep. of Germany .

Primary Examiner—A. J. Heinz
Attorney, Agent, or Firm—Finnegan, Henderson, Farabow, Garrett and Dunner

[57] ABSTRACT

A cassette transfer apparatus includes a transfer frame having a holding portion for holding a cassette in an interior thereof. A drive mechanism for taking a cassette into the holding portion includes an endless belt which has a linear portion extending along the holding portion, and a drive source for running the belt. An engaging member engageable with an engagement portion of the cassette is attached to the belt for movement therewith. When the belt is driven while the engaging member engages the engagement portion, the engaging member takes the cassette into the holding portion. The engaging member has a guide pin which is guided by a guide groove formed on the transfer frame, when the engaging member passes along the linear portion, thereby preventing rotation of the engaging member.

11 Claims, 12 Drawing Sheets

CASSETTE TRANSFER APPARATUS

BACKGROUND OF THE INVENTION

1. Field of the Invention

The present invention relates to a cassette transfer apparatus for transferring a cassette incorporating an information storage medium therein to a desired position and for loading/unloading the cassette with reference to a given device.

2. Description of the Related Art

U.S. patent application Ser. No. 043,252, filed by the present applicant on Apr. 27, 1987, discloses an automatic disk cassette-changing apparatus employing a similar type of transfer apparatus to that provided by the present invention. The changing apparatus comprises an information processing device, and a storage section located adjacent to the information processing device and storing a number of optical disk cassettes. The transfer apparatus carries a cassette between the processing device and the storage section, and loads or unloads the cassette from the processing device or the storage section.

The transfer apparatus includes a cassette-holding portion therein, and a pair of endless belts movable along the respective edges of the holding portion. A pawl engageable with a cassette is fixed to each belt. A cassette can be taken from either the storage section or the processing device and set in the holding portion of the transfer apparatus by driving the belts in a predetermined direction, with their pawls engaged with the cassette, and can be loaded into the storage section or the processing device by driving the belts in the opposite direction to the above predetermined direction.

However, the transfer apparatus having the above construction has the problem that a cassette is likely to be disengaged from the pawls, due to flection of the belts or for some other causes, when it is being taken into the holding portion or taken out thereof. In this case, the cassette cannot be set in the holding portion or taken out thereof, so that an automatic cassette-changing operation with reference to the processing device becomes impossible to perform.

In addition, it may happen that the pawls of the belts will catch the cassette, preventing reliable engagement or disengagement of the cassette. In this case as well, the automatic cassette changing operation becomes impossible to perform.

SUMMARY OF THE INVENTION

The present invention has been developed in consideration of the above problems, and its object is to provide a cassette transfer apparatus enabling a cassette to be reliably taken into and out of its holding portion.

To achieve this object, according to a cassette transfer apparatus of the present invention, an engaging member has a guide pin, and holding means includes guide means extending parallel to the linearly-extending portion of the belt and engageable with the guide pin. With this construction, when the engaging member moves along the linearly-extending portion of the belt with engaging a cassette, the guide pin engages the guide means to prevent the engaging member from rotating. Therefore, the engaging member does not disengage from the cassette during transfer of the cassette, so that the cassette can be reliably taken into and taken out of the holding means.

BRIEF DESCRIPTION OF THE DRAWINGS

FIGS. 1 through 14 show an automatic disk cassette-changing apparatus which incorporates a cassette transfer apparatus according to one embodiment of the present invention, wherein.

DETAILED DESCRIPTION OF THE PREFERRED EMBODIMENTS

An embodiment of the present invention will now be described, with reference to the accompanying drawings.

Figure 1:
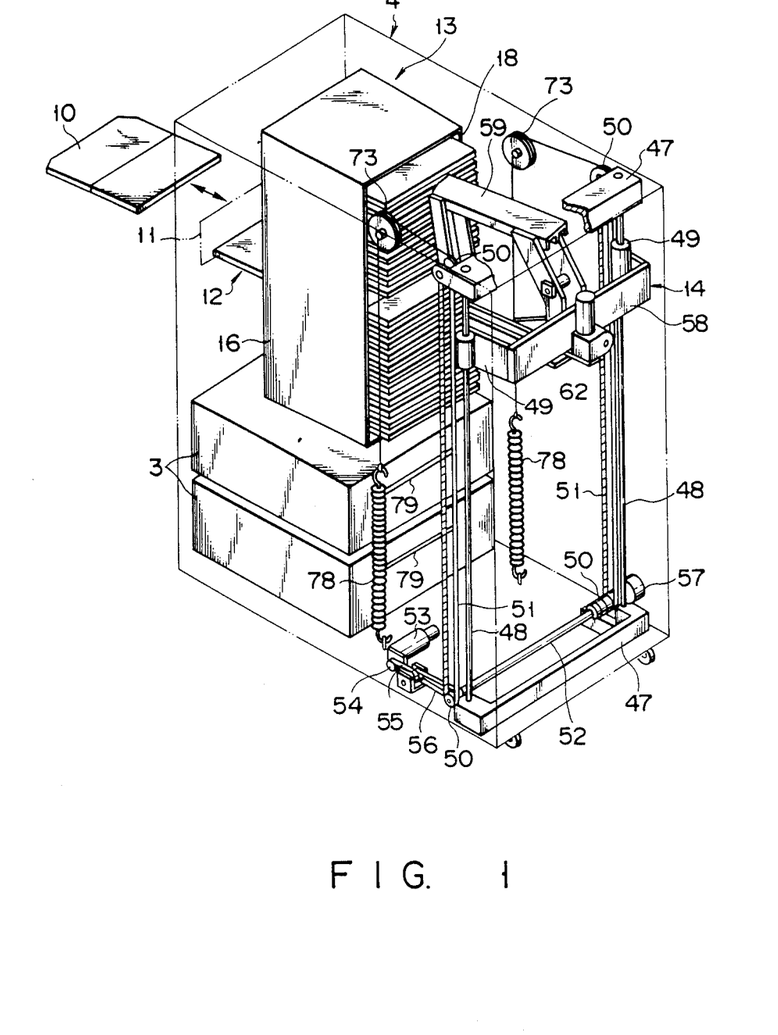
FIG. 1 is a perspective view showing the internal construction of the automatic changing apparatus.
Figure 2:
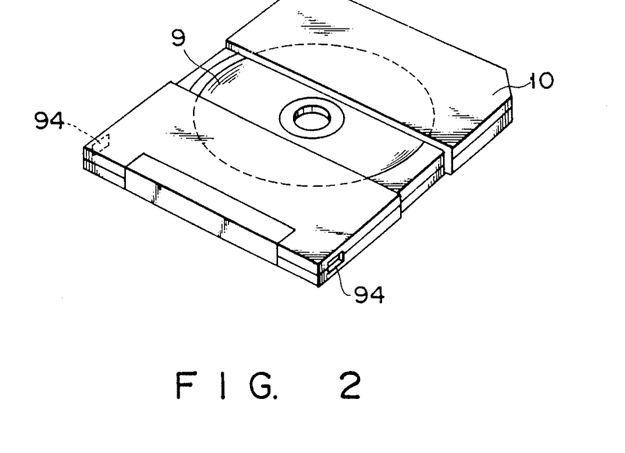
FIG. 2 is a perspective view of an optical disk cassette.
Figure 3:
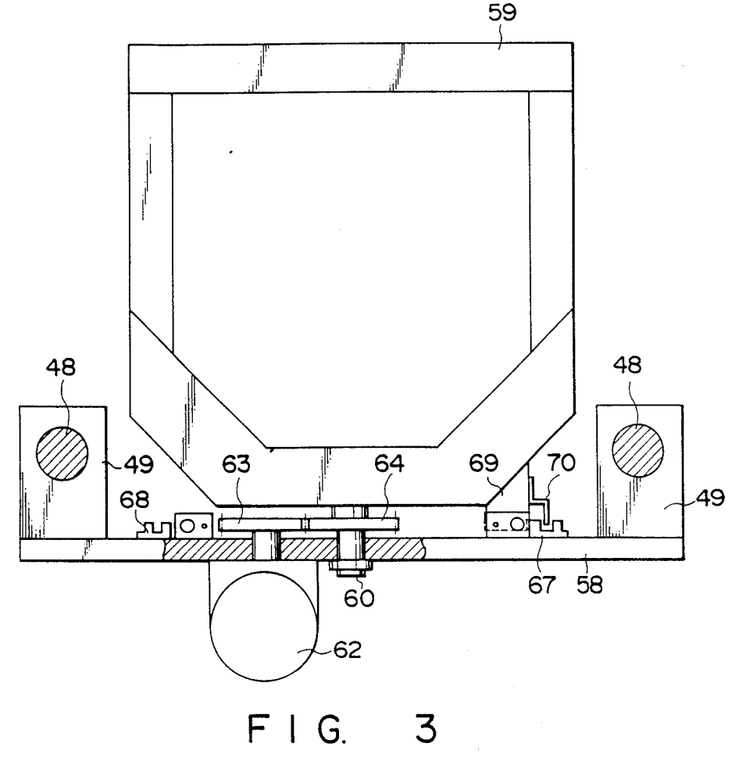
FIG. 3 is a plan view schematically showing both the transfer frame and positioning mechanism of the transfer apparatus.
Figure 4:
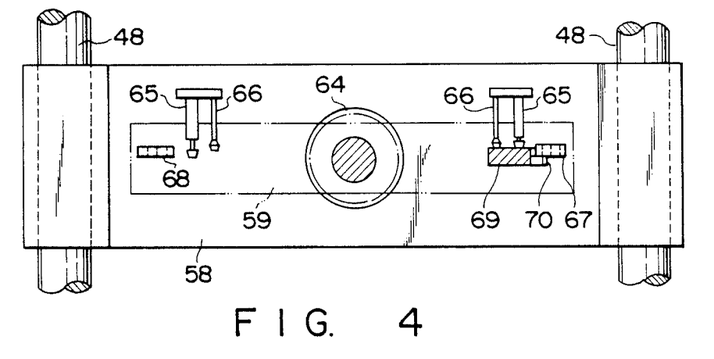
FIG. 4 is a front view of the positioning mechanism.

FIG. 1 shows automatic cassette changing apparatus 4 in which a cassette transfer apparatus according to an embodiment of the present invention is incorporated. Automatic changing apparatus 4 comprises a housing. In the front wall of the housing is formed inlet/outlet slot 11 through which disk cassette 10 can be inserted into and taken out of apparatus 4 in a substantially horizontal state. As is shown in FIG. 2, cassette 10 contains optical disk 9 therein. Optical disk 9 has an information memory layer on each surface, and information can be recorded in the layer and reproduced therefrom by use of laser beams or the like. Depression 94, which is engageable with an engaging pawl of the transfer apparatus to be mentioned later, is formed at the front end portion of each side edge of cassette 10.

As is shown in FIG. 1, changing apparatus 4 comprises carrying mechanism 12 for carrying disk cassette 10 through slot 11, storage section 13 for storing a plurality of cassettes 10 carried by carrying mechanism 12, two optical disk drive apparatuses (information recording/reproducing apparatuses) 3 for read/write-accessing disk 9 in disk cassette 10, and transfer apparatus 14 for transferring disk cassette 10 between optical disk drive apparatuses 3, carrying mechanism 12 and storage section 13. Storage section 13 and apparatuses 3 are aligned with each other along a Z direction (i.e., the vertical direction).

Storage section 13 stores a large number of cassettes 10 such that cassettes 10 are vertically (Z direction) stacked with a predetermined space therebetween while each cassette lies substantially horizontally (in Y direction) and partially extends forward from section 13.

Cassette 10 can be stored in or removed from the front side of storage section 13 by transfer apparatus 14.

In storage section 13, cassette 10 is stored such that its front end portion, on which depressions 94 are formed, faces transfer mechanism 14.

Transfer apparatus 14 will be described in detail. As is shown in FIG. 1, apparatus 14 comprises a pair of parallel guide shafts 48. Shafts 48 oppose storage section 13 and optical disk drive apparatuses 3 and extend in the Z direction. The upper and lower ends of shafts 48 are fixed to a pair of horizontal frames 47, respectively. Carriage 49 is mounted on each guide shaft 48 to be movable in the Z direction. Carriages 49 are connected to each other by arm base 58. Two rollers 50 are mounted on each frame 47 and are located on the upper and lower end sides of corresponding guide shafts 48. Belts 51 are looped between two pairs of rollers 50 along guide shafts 48, respectively. Lower rollers 50 are connected to each other by shaft 52 and are rotated together. A driving force of servo motor 53 is transmitted to shaft 52 through pulley 54, belts 55 and 56, and the like. Parts of belts 51 are coupled to corresponding carriages 49. When servo motor 53 is rotated in the forward direction, carriages 49 are moved by corresponding belts 51 in the Z direction. Absolute encoder 57 is mounted at one end of shaft 52 to detect a rotational position of shaft 52, thereby constantly detecting the absolute positions of carriages 49. More specifically, encoder 57 detects the position of carriages 49 as a coordinate position in the moving coordinate system of the carriages.

Shaft 60 is fixed to the center of arm base 58 and horizontally extends therefrom, as is shown in FIGS. 1 and 3 to 6. Double transfer frame 59 is rotatably mounted on shaft 60 by means of bearing 61. Frame 59 comprises first and second holding frames 71 and 72 integrally formed with each other. Worm-geared motor 62 is mounted on arm base 58. Driving force of motor 62 is transmitted to frame 59 through first spur gear 63 mounted on the output shaft of motor 62 and second spur gear 64 which is mounted on frame 59 to be rotatable about shaft 60 and meshed with gear 63. When motor 62 is rotated in the forward/reverse direction, double transfer frame 59 is rotated 180 degrees in the forward/reverse direction and is stopped horizontally. A pair of shock absorbers 65, a pair of adjustment stoppers 66, and detectors 67 and 68 are symmetrical about shaft 60 and are mounted on arm base 58. Arm stopper 69 and light-shielding plate 70 are mounted on frame 59 and are spaced apart from shaft 60 and oppose arm base 58. When frame 59 is rotated from the horizontal position, plate 70 is detected by detector 67 or 68. Motor 62 is then deenergized, and frame 59 is rotated by its inertia. When arm stopper 69 abuts against corresponding shock absorber 65 and the impact is absorbed thereby, stopper 69 urges corresponding adjustment stopper 66, thereby stopping rotation of frame 59. Since arm stopper 69 is urged against stopper 66 and is thus stopped, play is not caused by gear meshing of first and second spur gears 63 and 64 and the like, and frame 59 can be accurately located in position. In the position where light-shielding plate 70 is detected by detector 67, first cassette holding frame 71 in frame 59 faces upward. However, in the position where plate 70 is detected by detector 68, second cassette holding frame 72 faces upward.

Figure 9:
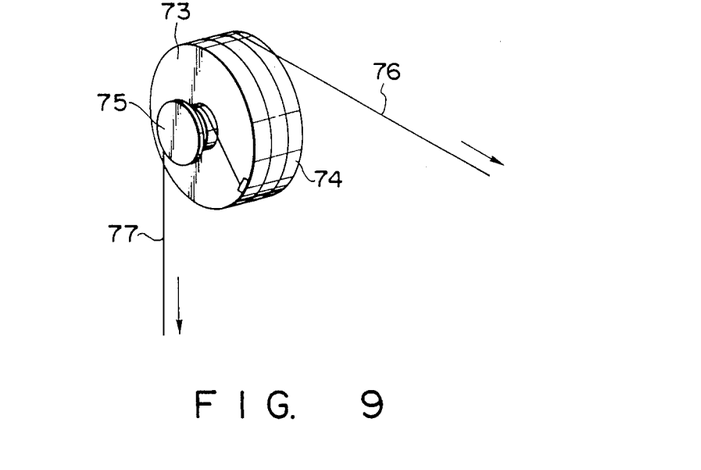
FIG. 9 is a perspective view of a wheel.
Figure 10:
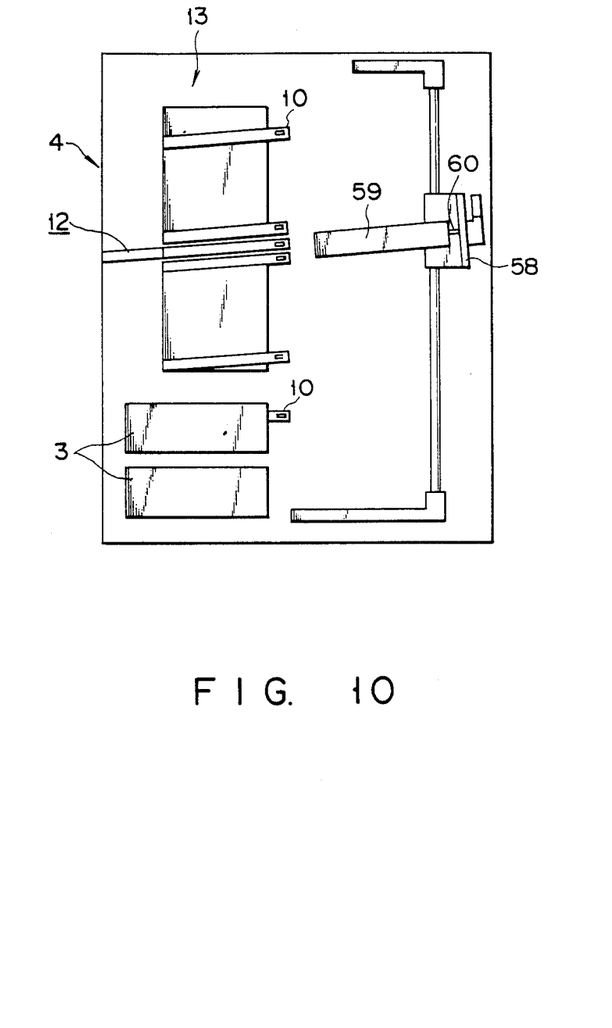
FIG. 10 is a side view schematically showing the entirety of the automatic changing apparatus.
Figure 11A:
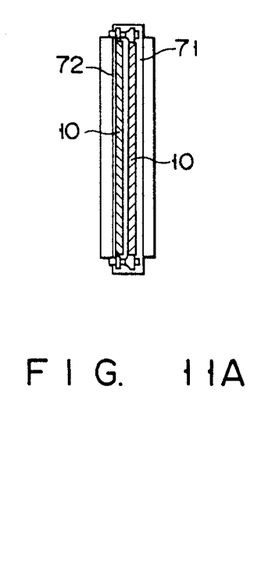
FIGS. 11A and 11B are front and plan views, respectively, showing a state in which a cassette is received in the transfer frame.
Figure 11B:
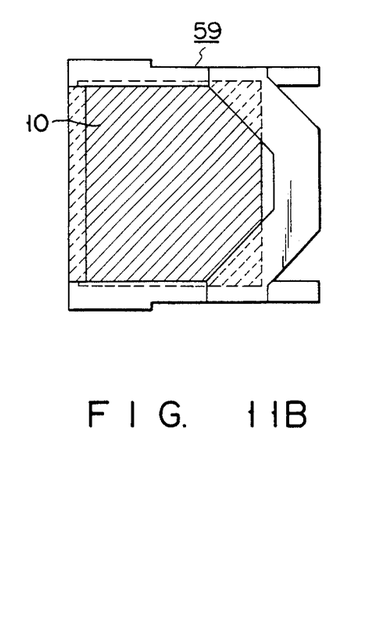

As is shown in FIGS. 1 and 9, a pair of wheels 73 are rotatably mounted on upper frame 47 through a support arm (not shown). Each wheel 73 comprises large- and small-diameter rollers 74 and 75 which are concentric and formed integrally. One end of each of two wires 76 and 77 is fixed to a corresponding one of wheels 73. An intermediate portion of wire 76 is wound around roller 74 and a fixed roller (not shown). The other end of wire 76 is fixed to corresponding carriage 49. The intermediate portion of wire 77 is wound around small-diameter roller 75, and the other end of wire 77 is connected to one end of spring 78. The other end of spring 78 is connected to lower frame 47. The weight of carriage 49 is balanced with the tension force of spring 78. Cassettes 10 are stored in storage section 13 in an inclined manner. As is shown in FIG. 10, shaft 60 as the rotational center of frame 59 is also inclined at the same angle as that of cassette 10. By this inclination, cassette 10 can be inserted into or removed from slot 79 (FIG. 1) of each optical disk drive apparatus 3.

As is shown in FIGS. 5 through 8, double transfer frame 59 comprises rear frame 80, a pair of parallel side frames 81 and 82, and front frame 83, and has a substantially rectangular shape. Frame 59 is supported, with its rear frame 80 attached to shaft 60. Stopper 69 and light-shielding plate 70 are fixed to rear frame 80. Since side frames 81 and 82 are symmetric with reference to each other, only side frame 81 will be described below. Side frame 81 comprises upper plate 22a, intermediate plate 22b, and lower plate 22c, which extend horizontally while being spaced from each other by a predetermined distance. These three plates are connected together by means of vertical coupling plate 23. The space between upper and intermediate plates 22a and 22b constitutes support groove 81a along which a side edge portion of cassette 10 is guided. Upper and intermediate plates 22a and 22b of side frame 81 and the corresponding plates of side frame 82 constitute first holding frame 71 for holding cassette 10 inside. Likewise, the space between intermediate and lower plates 22b and 22c constitutes support groove 81b, and intermediate and lower plates 22b and 22c of side frame 81 and the corresponding plates of side frame 82 constitute second holding frame 72 for holding cassette 10 inside.

A pair of coaxial guide rollers 86 are rotatably attached to the front end of side frame 81 such that they are located in the front-end regions of support grooves 81a and 81b, respectively. Likewise, a pair of coaxial guide rollers 87 are rotatably attached to the rear end of frame 81 such that they are located in the rear-end regions of support grooves 81a and 81b, respectively. Belt 85a is looped between the two rollers (86, 87) located in support groove 81a, and belt 85b is looped between the two rollers (86, 87) located in support groove 81b. Each belt has a linear portion extending between rollers 86 and 87. Belts 85a and 85b are driven in an endless fashion such that they move in support grooves 81a and 81b, respectively. As in side frame 81, parallel support grooves 82a and 82b are defined in side frame 82, and guide rollers 86 are located in the front-end regions of support grooves 82a and 82b and guide rollers 87 are located in the rear-end regions of support grooves 82a and 82b. Belts 85a and 85b are looped between guide rollers 86 and 87, and are driven in support grooves 82a and 82b, respectively. Each belt has a linear portion extending between rollers 86 and 87. The linear portions of belts 85a face to each other with a distance substantially equal to a width of cassette 10. The linear portions of belts 85b are arranged in a similar manner. First and second cassette holding frames 71 and 72 are arranged symmetrical with reference to shaft 60, and are reversed in position each time transfer frame 59 rotates 180 degrees.

Figure 5:
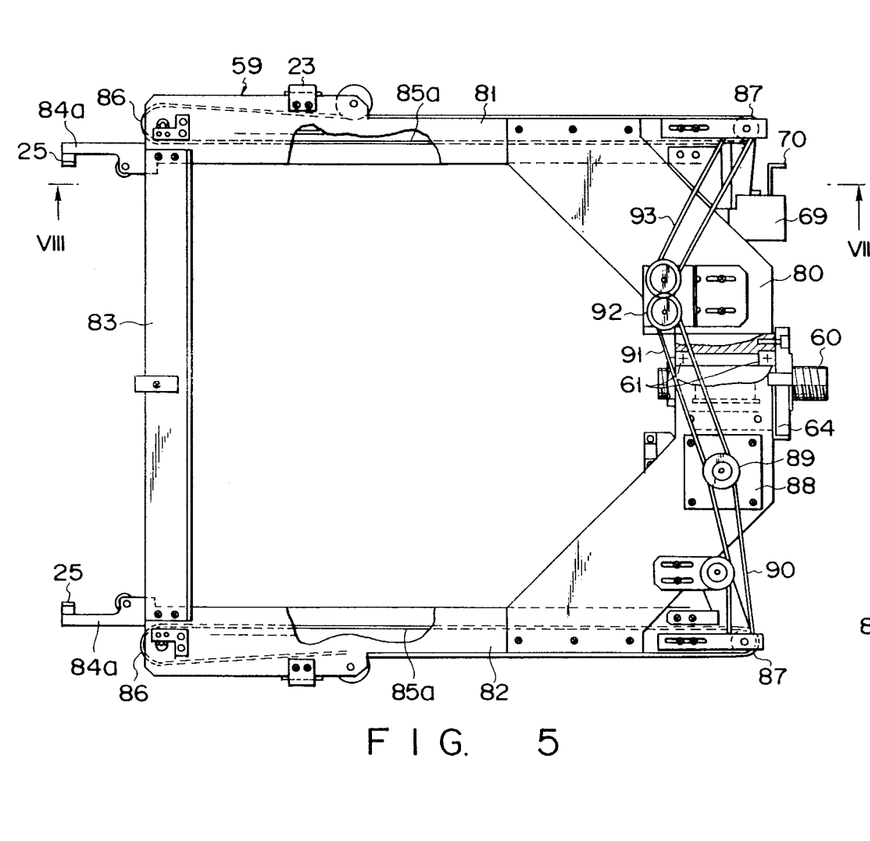
FIGS. 5 and 6 are plan and rear views, respectively, showing the internal construction of the transfer frame.
Figure 6:
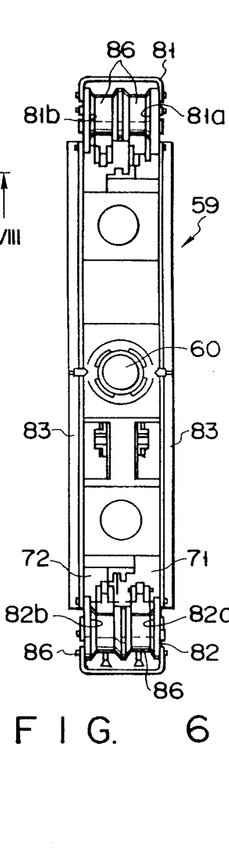

Belt 85a is driven by stepping motor 88 mounted on rear frame 80. More specifically, the driving force of motor 88 is transmitted to belt 85a provided for side frame 82, by way of pulley 89 fixed to the rotation shaft of motor 88, belt 90, pulley 87a coaxial with roller 87, and roller 87. It is also transmitted to belt 85a provided for side frame 81, by way of pulley 89, belt 91, a pair of pulleys 92, belt 93, pulley 87a, and roller 87. Belts 85b are driven by a driving mechanism having a similar structure to that mentioned above, but can be driven independently of belts 85a.

Figure 7A:
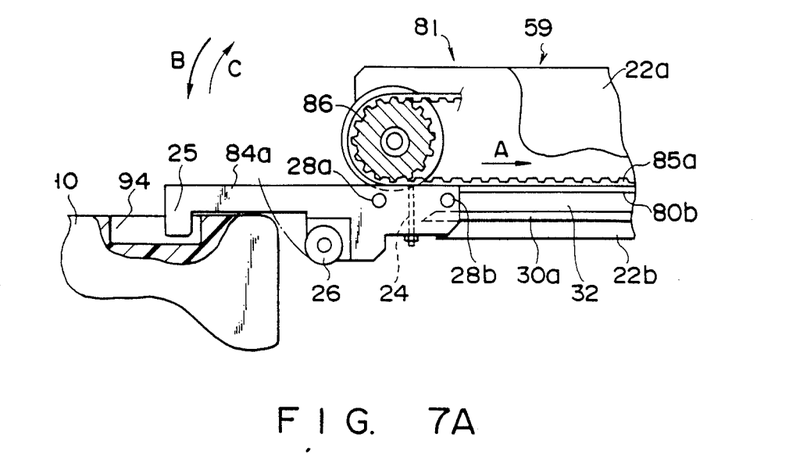
FIGS. 7A is a plan view showing a slide pawl and its neighboring region in an enlarged scale.
Figure 7B:
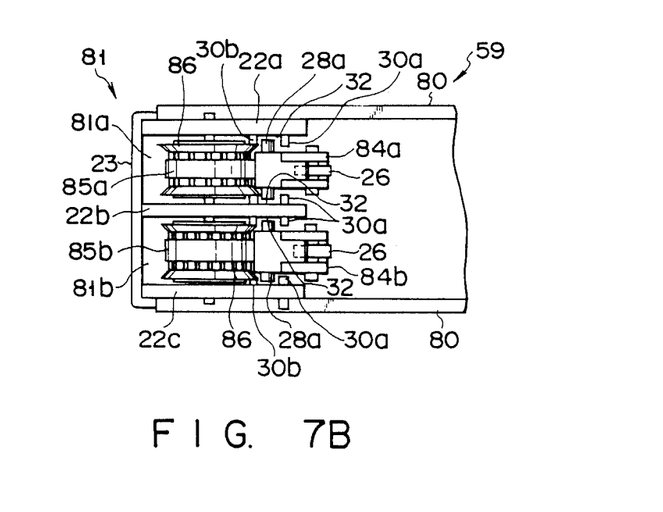
FIG. 7B is a front view showing the slide pawl and its neighboring region.
Figure 8:
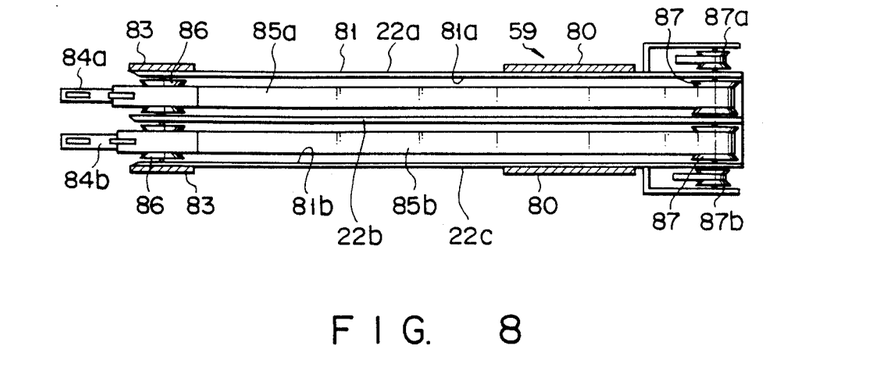
FIG. 8 is a sectional view taken along line VIII–VIII in FIG. 5.

Slide pawls 84a and 84b are fixed to belts 85a and 85b, respectively, by means of metallic coupling member 24. Slide pawls 84a and 84b move in support grooves 81a and 81b (82a and 82b), together with their respective belts. Each pawl has projection 25 at its distal end, and this projection is engageable with depression 94 (FIG. 2) formed in the front end of each side edge of cassette 10. Pulley 26 is rotatably attached to a middle part of each pawl. A pair of guide pins 28a and 28b are provided at the proximal end of each pawl such that they are spaced from each other in the running direction of belt 85a (85b). Each guide pin extends vertically, and its two ends are projected from the corresponding slide pawl upward and downward, respectively.

Slide pawls 84a and 84b are rotated when they are moved along the outer circumference of guide rollers 86. As a result of this rotation, projection 25 of each slide pawl engages with depression 94 of cassette 10 or disengages therefrom. If, for example, belt 85a runs in the direction indicated by arrow A, as is shown in FIG. 7A, then slide pawl 84a, which has been moved along the outer edge of side frame 81, is rotated in the direction indicated by arrow B when it passes along the outer circumference of guide roller 86. As a result, projection 25 engages with depression 94 of cassette 10. Conversely, if belt 85a runs in the opposite direction to that indicated by arrow A, then slide pawl 84a, which has been in the state shown in FIG. 7A, is rotated along guide roller 86 in the direction indicated by arrow C, with the result that projection 25 is disengaged from depression 94 of cassette 10. Even if pawl 84a (or 84b) touches a corner of cassette 10 during rotation along the circumference of guide roller 86, it does not catch cassette 10, due to the provision of pulley 26. Since, therefore, each slide pawl rotates smoothly, its projection can reliably engage and disengage from depression 94 of cassette 10.

In side frames 81 and 82, each of the facing surfaces of upper and intermediate plates 22a and 22b is provided with a pair of parallel guide ribs 30a and 30b extending along belt 85a. Guide groove 32 is defined between these guide ribs. Likewise, each of the facing surfaces of intermediate and lower plates 22b and 22c is provided with a pair of parallel guide ribs 30a and 30b, and guide groove 32 is defined between these guide ribs.

When the slide pawl passes through the interior of the support grove, driven by belt 85a (85b), its guide pins 28a and 28b enters guide grooves 32 and are guided thereby. For example, in the case where cassette 10 is carried into first holding frame 71, guide pin 28b enters guide grooves 32 (see FIG. 7A), simultaneously when slide pawl 84a is rotated to the position where projection 25 engages with depression 94 of cassette 10. When belt 85a is driven further in the direction indicated by arrow A, with guide pin 28b inserted within guide grooves 32, pawl 84a draws cassette 10 into first holding frame 71. At this time, pawl 84a is applied with a force which causes it to move away from cassette 10 (i.e., a force acting in the direction indicated by arrow C). However, pawl 84a is prevented from being rotated since guide pin 28b is inserted in guide grooves 32. Therefore, projection 25 is kept engaged with depression 94 of cassette 10. When pawl 84a is moved in the direction indicated by arrow A, together with cassette 10, not only guide pin 28b but also guide pin 28a enters guide grooves 32, so that pawl 84a is prevented from being rotated during its movement. Since, therefore, projection 25 of pawl 84a is reliably prevented from disengaging from depression 94 of cassette 10, cassette 10 can be reliably carried into first holding frame 71.

As in the above-mentioned case, the slide pawl is reliably prevented from disengaging from a depression of cassette 10 when cassette 10 is taken out of first holding frame 71.

Figure 12A:
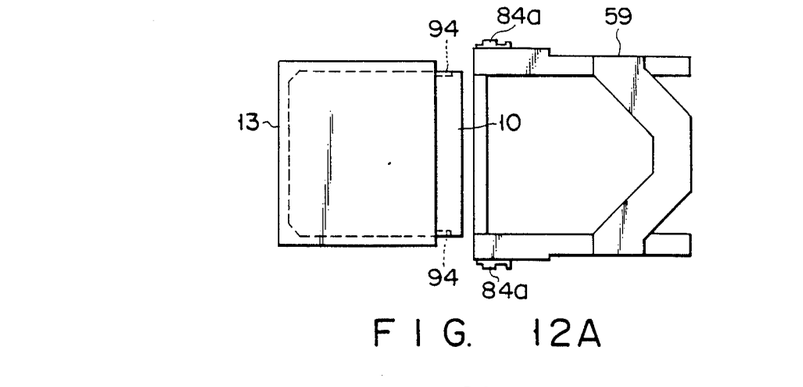
FIGS. 12A through 12C are plan views schematically showing how the cassette is taken into the transfer frame.
Figure 12B:
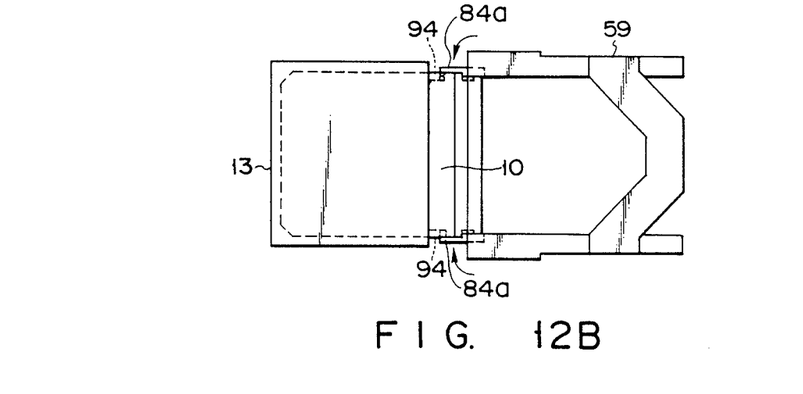
Figure 12C:
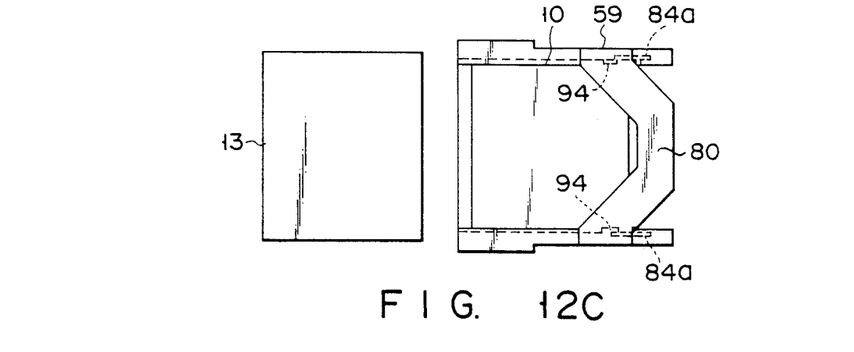

A description will be given of the case where desired cassette 10 is transferred from storage section 13 into transfer frame 59. First of all, transfer frame 59 is moved to a position where one holding frame (e.g., first holding frame 71) faces the desired cassette, as is shown in FIG. 12A. In the state, slide pawls 84a are located outside of side frames 81 and 82. Then, each pawl 84a is moved such that it engages with depression 94 of cassette 10, as is shown in FIG. 12B. When pawls 84a are further driven, cassette 10 is received into the holding frame by pawls 84a, as is shown in FIG. 12C. The received cassette 10 abuts against rear frame 80 and is positioned thereby at predetermined position in transfer frame 59.

To transfer cassette 10 from transfer frame 59 to either storage section 13 or disk drive apparatus 3, the above operations are performed in the reverse order.

As is shown in FIG. 10, cassette 10 ejected from optical disk drive apparatus 3 is located in the same state as that of other cassettes 10 stored in storage section 13. For this reason, cassette 10 can be carried from disk drive apparatus 3 in transfer frame 59 with the same manner as in the case wherein cassette 10 is carried from the storage section in the transfer frame. In addition, the ejection procedures are identical in the above operations.

Figure 13A:
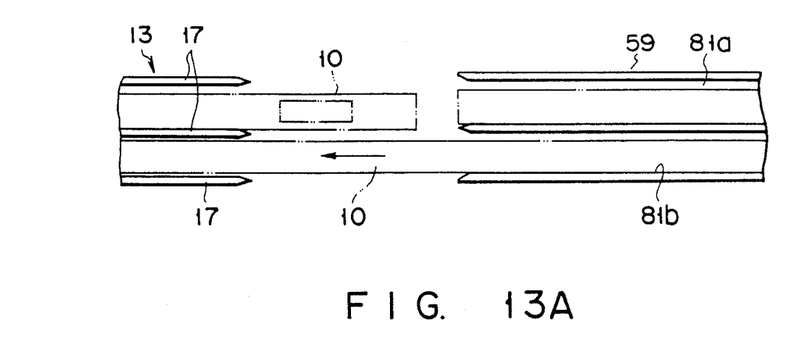
FIGS. 13A and 13B are views schematically showing how the storage section and the transfer frame are positioned with reference to each other during the setting and takeout of the cassette.
Figure 13B:
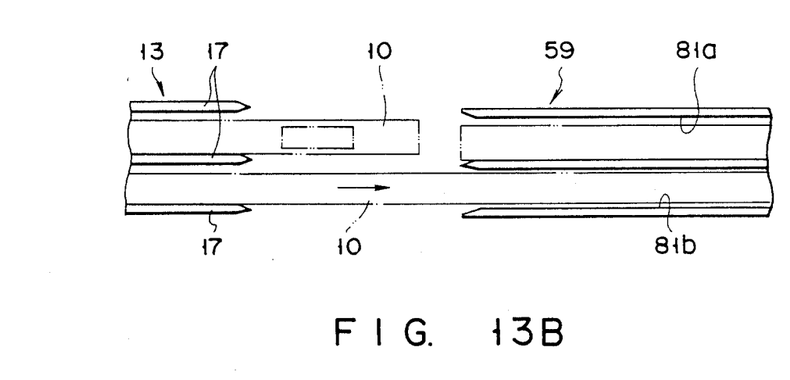

The width of each support groove 81a, 81b of frame 59 is larger than the thickness of cassette 10, so that the cassette can be easily inserted in frame 59. Similarly, the pitch of guide 17 in storage section 13 is larger than the thickness of cassette 10. Therefore, the cassette can be easily received by the storage section. When cassette 10 is to be carried from frame 59 in storage section 13, frame 59 is positioned such that the cassette held therein is located between adjacent guides 17 in the storage section, as is shown in FIG. 13A. However, when cassette 10 is to be taken into frame 59 from storage section 13, frame 59 is positioned such that the cassette is located at the middle portion of support groove 81a or 81b, as is shown in FIG. 13B.

When cassette 10 is to be loaded in or removed from disk drive apparatus 3, frame 59 is positioned in the same manner as described above.

With transfer apparatus 14 having the structure described above, cassette 10 carried in storage section 13 by carrying mechanism 12 is loaded once in optical disk drive apparatus 3. Drive apparatus 3 reads information from disk 9 and discriminates side A or B of disk 9. On the basis of such discrimination information, cassette 10 is stored in an empty space in storage section 13 in the same orientation as that of other cassettes. Transfer apparatus 14 performs the following operations: a loading operation for transferring designated disk cassette 10 from storage section 13 to designated optical disk drive apparatus 3 and loading it therein; an ejecting operation for transferring cassette 10 ejected from designated disk drive apparatus 3 to storage section 13 and storing it where it was; a disk changing operation as a combination of loading and ejecting operations; a reversing operation for taking out cassette 10 from designated disk drive apparatus 3, reversing the side of cassette 10 from side A to side B and vice versa, and loading the reversed cassette into the disk drive apparatus again; and a returning operation for taking out designated disk cassette 10 from storage section 13, and conveying it to carrying mechanism 12, and causing mechanism 12 to carry it out of slot 11.

Figure 14A:
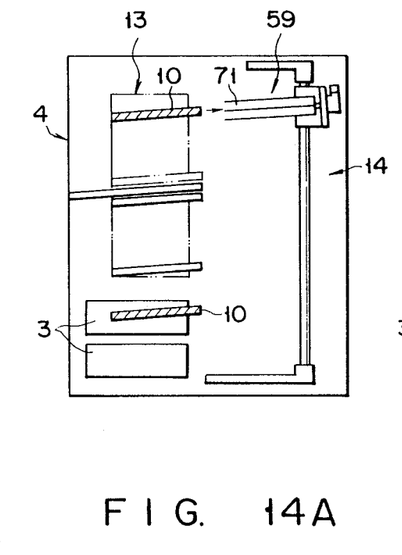
FIGS. 14A through 14E are views schematically showing a cassette changing operation.
Figure 14B:
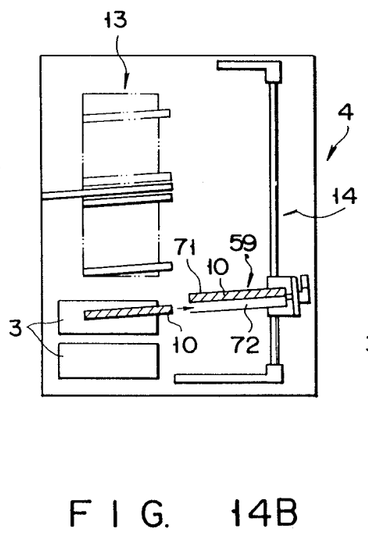
Figure 14C:
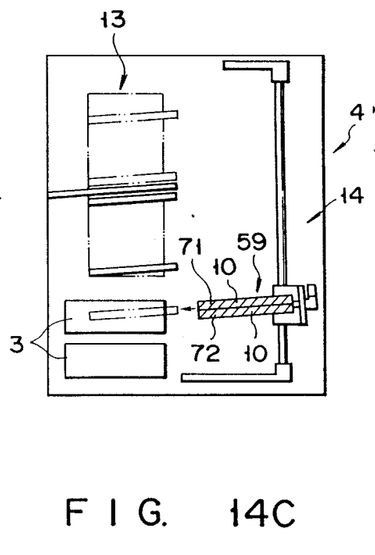
Figure 14D:
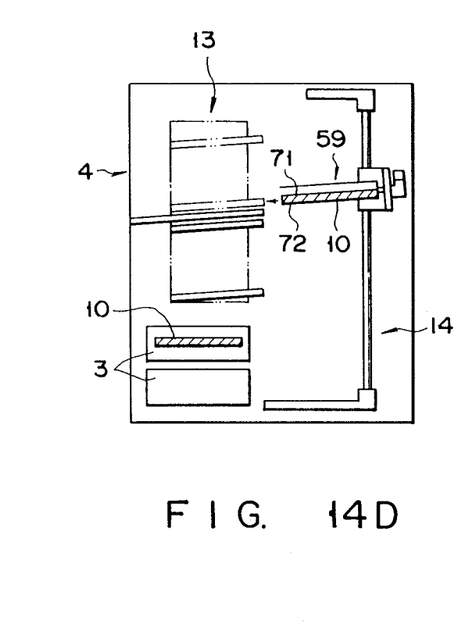
Figure 14E:
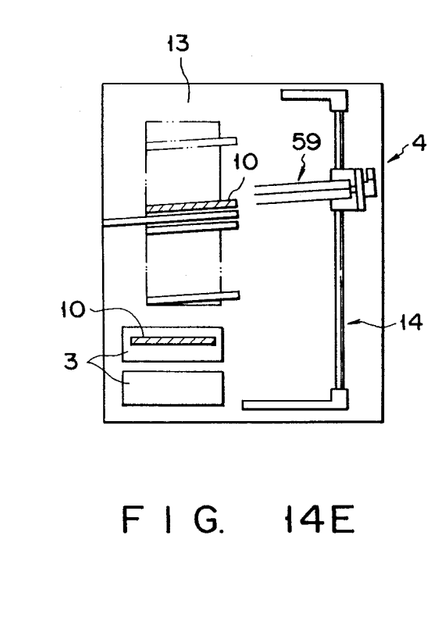

The overall operation of automatic disk changing apparatus 4 will be described with reference to FIGS. 14A to 14E, wherein the disk changing operation is exemplified. First, an operator inputs a processing instruction, that is, a signal indicative of the specific disk cassette 10 to be loaded into disk drive apparatus 3, on a main controller (not shown). The controller 1 delivers a signal, which is indicative of a target-coordinate position to which transfer frame 59 is to be moved, that is, the coordinate position of the designated disk cassette. At this time, the current-coordinate position of transfer frame 59 detected by encoder 57 is stored in the controller. In the controller, the current-coordinate position is subtracted from the target-coodinate position. In accordance with the calculation result, the controller delivers control data for controlling the speed and direction of servo motor 53. If the difference between the current and target-coordinate positions is relatively great, the delivers control data for moving transfer frame 59 at constant speed. As frame 59 approaches the target-coordinate position, thus reducing the value of the subtraction result, the controller delivers control data for moving frame 59 in a decelerating manner. As a result, the rotating speed of motor 53 and therefore, the moving speed of frame 59, are lowered. When the control data is delivered to motor 53, transfer frame 59 is moved to a position where, for example, first holding frame 71 opposes designated disk cassette 10, as is shown in FIG. 14A. Cassette 10 is taken into holding frame 71. Subsequently, by repeating the aforesaid operation, frame 59 is moved to a position where second holding frame 72 opposes designated optical disk drive apparatus 3, as is shown in FIG. 14B. Meanwhile, cassette 10 is ejected from disk drive apparatus 3. Subsequently, cassette 10 ejected from apparatus 3 is taken into second holding frame 72. As is shown in FIG. 14C, frame 59 is moved to a position where cassette 10 in holding frame 71 can be inserted in apparatus 3. Cassette 10 is then loaded in apparatus 3. Then, control data is delivered from the controller to motor 53, and frame 59 is moved to a position where second holding frame 72 opposes that portion in storage section 13 wherein cassette 10 held by frame 72 was stored, as is shown in FIG. 14D. Cassette 10 held by frame 72 is then returned to the position where it was in storage section 13. In the state shown in FIG. 14E, the disk changing operation is completed.

In the above description, the disk changing operation does not accompany rotation of transfer frame 59. However, when cassette 10 is to be inserted in the optical disk drive apparatus, frame 59 may be rotated 180 degrees to reverse the side of the cassette, and the reversed cassette may be inserted in disk drive apparatus 3. Various operations can be performed by combining the rotating operations and another operation of double transfer frame 59.

The automatic changing apparatus having the arrangement described above has the following advantages. Transfer frame 59 comprises first and second holding frames 71 and 72 for respectively holding the cassettes. For this reason, when the cassette in disk drive apparatus 3 is to be changed with another cassette, frame 59 can hold both the cassette transferred from storage section 13 and the cassette ejected from disk drive apparatus 3. Therefore, the cassettes can be changed by one reciprocal cycle of the transfer frame between the storage section and the disk drive apparatus, thereby greatly shortening the cassette changing operation. The distance between the first and second holding frames is the same as the pitch of the guides in the storage section. At the same time, the positions of the first and second holding frames are reversed upon rotation of the transfer frame through 180 degrees. For these reasons, the number of positioning points of the transfer frame with respect to the storage section is small. Thus, positioning control in the vertical direction, i.e., a direction in which the transfer frame is moved, can be easily performed.

In cassette transfer apparatus 14, each slide pawl is provided with guide pins. When the slide pawl engaged with a cassette is moved inside the holding frame, the guide pins move in engagement with the guide grooves of the holding frame. Since, therefore, the guide pins reliably prevent the slide pawl from rotating during the movement of the pawl, the engagement between the depression of the cassette and the projection of the pawl can be reliably maintained. As a result, the cassette can reliably be carried into the holding frame or taken out of the holding frame. Furthermore, each slide pawl is provided with a pulley. This pulley prevents the pawl from catching the cassette when the pawl engages with the depression of the cassette or disengaged therefrom. Therefore, the slide pawl can be smoothly engaged with the depression of the cassette or disengaged therefrom.

The present invention is not limited to the particular embodiment described above. Various changes and modifications may be made within the spirit and scope of the invention. In the above embodiment, the information memory media are stacked vertically. However, the stacking direction may be horizontal. In this case, the transfer frame is moved horizontally.

What is claimed is:

1. A cassette transfer apparatus for transferring to a desired location a cassette having a plurality of engagement portions, the transfer apparatus comprising:
   means for holding the cassette, said holding means including an entry and exit port for admitting the cassette into holding means and ejecting the cassette from the holding means; and
   means for delivering the cassette to the holding means, said delivery means including:
   a plurality of first guide rollers attached to the holding means adjacent the entry and exit port;
   a plurality of second guide rollers attached to the holding means and spaced from said first guide rollers;
   a plurality of belts, each said belt extending between a respective first and second guide roller and including a linear portion extending along the holding means, the linear portions of each said belt facing each other at a distance substantially equal to the width of the cassette;

a plurality of engaging members disposed in engagement with the respective portions of cassette and attached to a respective belt for movement therewith, each of the engaging members including a guide pin;

means for driving each of the belts in a forward direction for producing a forward movement of the belt to deliver the cassette to the holding means and for driving each of the belts in a reverse direction for producing a reverse movement of the belt to deliver the cassette from the holding means, said first and second guide rollers and said belts being arranged so that during the forward movement of the belts, the engaging members are rotated to engage the engagement portions of the cassettes while passing around the respective first guide rollers and move while engaging the engagement portions of the cassette as the engaging member passes along the linear portions of each said belt, and during the reverse movement of the belts, the engaging members move while engaging the engagement portions of the cassette as the engaging member passes along the linear portions of each said belt and rotate and disengage from the engagement portions of the cassette while passing around the first guide rollers; and means for guiding each said guide pin when the engaging members move along the linear portions of the belts, so as to prevent rotation of the engaging members.

2. A cassette transfer apparatus for transferring to a desired location a cassette having an engagement portion, said transfer apparatus comprising:

means for holding the cassette, said holding means having a cassette entry and exit port for admitting the cassette into the holding means and for ejecting the cassette from the holding means; and means for delivering the cassette to the holding means, the delivery means including:

a first guide roller attached to the holding means adjacent the entry and exit port;

a second guide roller attached to the holding means and spaced from the first guide roller;

a belt extending between the first and second guide rollers including a linear portion extending along the holding means;

an engaging member disposed in engagement with the engagement portion of the cassette and attached to the belt for movement therewith, the engaging member including a guide pin, the first and second guide rollers and the belt being arranged so that said engaging member is rotated to engage the engagement portion of the cassette as the engaging member passes around the first guide roller and moves while engaging the engagement portion of the cassette as the engaging member passes along the linear portion of said belt;

means for driving the belt to cause the engaging member to engage the cassette and to deliver the cassette into the holding means; and means for guiding the guide pin while the engaging member, together with the cassette, moves along the linear portion of the belt so as to prevent rotation of the engaging member.

3. An apparatus according to claim 2, wherein said holding means includes a pair of parallel side frames spaced apart from each other by a predetermined distance and defining an inner space for holding a cassette, each of said side frames has a pair of support plates facing to each other with a predetermined distance to define a support groove for receiving a side edge portion of the cassette, and said first and second guide rollers are attached to the side frame and are located within one of the support grooves.

4. An apparatus according to claim 3, wherein said guide means is provided on the holding means and extending along the linear portion of the belt so as to guide the guide pin when the engaging member passes along the linear portion of the belt.

5. An apparatus according to claim 4, wherein said guide means includes a pair of guide ribs which are formed on an inner face of one of the support plate, extend parallel to the linear portion of the belt, and define a guide groove engageable with the guide pin.

6. An apparatus according to claim 5, wherein said guide means includes a pair of second guide ribs which are formed on an inner face of another of the support plate to face said guide ribs, extend parallel to the linear portion of the belt, and define a second guide groove engageable with the guide pin, and said guide pin projects from the engaging member and has two ends engageable with the first and second guide grooves, respectively.

7. An apparatus according to claim 2, wherein said engaging member includes a second guide pin which is spaced from the guide pin in a moving direction of the engaging member by a predetermined distance; and said guide pin is engaged with said guide means, substantially simultaneously when the engaging member, which has been rotated along the circumference of the first guide roller, reaches a position where the engaging member engages with the engagement portion of the cassette, and said second guide pin is arranged such that it is engaged with the guide means when the engaging member is situated on the linear portion of the belt.

8. An apparatus according to claim 2, wherein said engaging member includes a rolling member which rolls on the cassette, to thereby prevent the engaging member from catching the cassette when the engaging member is rotated along the first guide roller.

9. An automatic changing apparatus for changing a cassette housing an information storage medium and including an engagement portion, said changing apparatus comprising:

means for storing a plurality of cassettes;

information processing means for performing information processing on the information storage medium housed in the cassettes; and cassette transfer means for loading and unloading each of the cassettes from the storing means and for transferring each said cassette between the storing means and the information processing means, the cassette transfer means comprising:

means for holding each said cassette, said holding means including a cassette entry and exit port for admitting cassette into the holding means and ejecting each said cassette from the holding means;

means for delivering each said cassette to said holding means, said delivery means including:
- a first guide roller attached to the holding means adjacent the cassette entry and exit port;
- a second guide roller attached to the holding means and spaced from the first guide roller;
- a belt extending between the first and second guide rollers and including a linear portion extending along said holding means; and
- an engaging member attached to the belt for movement therewith and disposed in engagement with the engagement portion of the cassette, the engaging member including a guide pin, said first and second guide rollers and said belt being arranged so that the engaging member is rotated to engage the engagement portion of the cassette as the engaging member passes around the first roller and moves while engaging the engagement portion of the cassette as the engaging member passes along the linear portion of the belt;
- means for driving the belt to cause the engaging member to engage the cassette and to deliver the engaged cassette to the holding means; and
- means for guiding the guide pin when the engaging member moves along the linear portion of the belt so as to prevent rotation of the engaging member.

10. An apparatus according to claim 9, wherein said holding means includes a pair of parallel side frames spaced apart from each other by a predetermined distance and defining said holding portion, each of said side frames has a pair of support plates facing to each other with a predetermined distance to define a support groove for receiving a side edge portion of the cassette, and said first and second guide roller are attached to the side frame and are located within one of the support grooves.

11. An apparatus according to claim 9, wherein said holding means includes a first holding frame which has a first holding portion for storing a cassette in an interior thereof, a second holding frame which is integrally formed with the first holding frame and has a second holding portion for storing a cassette in an interior thereof, and second taking means for taking a cassette into the second holding portion; and
said second taking means includes:
- a second belt having linear portion extending along the second holding portion;
- means for driving the second belt;
- a second engaging member engageable with the engagement portion of a cassette and attached to the second belt for movement therewith, for taking a cassette into the second holding portion when the second belt is driven in a state where the second engaging member engages with the engagement portion of the cassette, said second engaging member having a second guide pin; and
- second guide means for guiding the second guide pin, when the second engaging member is on the linear portion of the second belt, so as to prevent rotation of the second engaging member.

* * * * *